United States Patent

Arnett et al.

[15] 3,650,154
[45] Mar. 21, 1972

[54] THERMOCOUPLE INPUT TEMPERATURE SENSING CIRCUITRY

[72] Inventors: Charles J. Arnett, Union; James M. Hoover, New Carlisle, both of Ohio

[73] Assignee: Instrulab, Inc., Dayton, Ohio

[22] Filed: Feb. 25, 1970

[21] Appl. No.: 13,998

[52] U.S. Cl. ..................................................73/361, 323/75 H
[51] Int. Cl. .......................................................G01k 7/12
[58] Field of Search..........................323/75 H, 75 N; 73/361

[56] References Cited

UNITED STATES PATENTS

| | | | |
|---|---|---|---|
| 1,745,149 | 1/1930 | Carney | 73/361 |
| 3,085,436 | 4/1963 | Huddleston | 73/361 |
| 3,280,630 | 10/1966 | Latham | 73/361 |
| 3,341,757 | 9/1967 | Cate | 323/75 N X |
| 3,349,321 | 10/1967 | Arksey | 323/75 N |
| 3,440,518 | 4/1969 | Cliffgard et al. | 323/16 X |
| 3,472,073 | 10/1969 | Irani | 73/360 |

Primary Examiner—S. Clement Swisher
Assistant Examiner—Frederick Shoon
Attorney—Jacox & Meckstroth

[57] ABSTRACT

Voltage sensing circuitry for use with a thermocouple having a voltage output which is related to the temperature thereof. The thermocouple output voltage is compared with a reference voltage and the difference is amplified. The reference voltage varies with ambient temperature in order to null out the effects of temperature change on the cold junction of the thermocouple circuit, the cold junction being disposed within the same region as that in which the temperature indicating circuitry is disposed. The differential voltage between the thermocouple output voltage and the reference voltage is amplified by a single-ended amplifier so that the output of the thermocouple has low impedance to a conductor which is common to a power supply, to the reference voltage, and to output receiver means. Thus, the circuitry has high common mode rejection, i.e., there is insignificant effect upon the output voltage of the circuitry if the thermocouple comes into contact with an external voltage.

5 Claims, 2 Drawing Figures

PATENTED MAR 21 1972

3,650,154

INVENTORS
CHARLES J. ARNETT
JAMES M. HOOVER

BY William R Jacox

ATTORNEY 3,650,154

THERMOCOUPLE INPUT TEMPERATURE SENSING CIRCUITRY

BACKGROUND OF THE INVENTION

Various thermocouple type temperature sensing devices have been created. However, in order to obtain high impedance circuitry to the thermocouple, the common practice is to convert the direct current thermocouple signal to alternating current by means of a chopper or the like. Then the resultant alternating current signal is passed through a transformer and amplified by an alternating current amplifier. Then the output of the alternating current amplifier is converted back to direct current. This direct current signal is then linearized and read. Such circuitry thus requires costly and bulky components, and is therefore objectionable. Furthermore, while this conventional type of circuitry does produce high impedance to the thermocouple, it also produces low common mode rejection. An isolation transformer is used to overcome this low common mode rejection condition. In addition to these objectionable features, known thermocouple responsive circuitry requires careful relative positioning of the components of the circuitry.

It is an object of this invention to provide thermocouple type sensing circuitry which has high input impedance characteristics and which also has high common mode rejection, without the use of a transformer, or a chopper, or an AC to DC converter.

It is another object of this invention to provide such circuitry which does not require careful relative positioning of components and which can be constructed in small physical size and at relatively low costs.

DESCRIPTION OF THE PREFERRED EMBODIMENT

Figure 1:
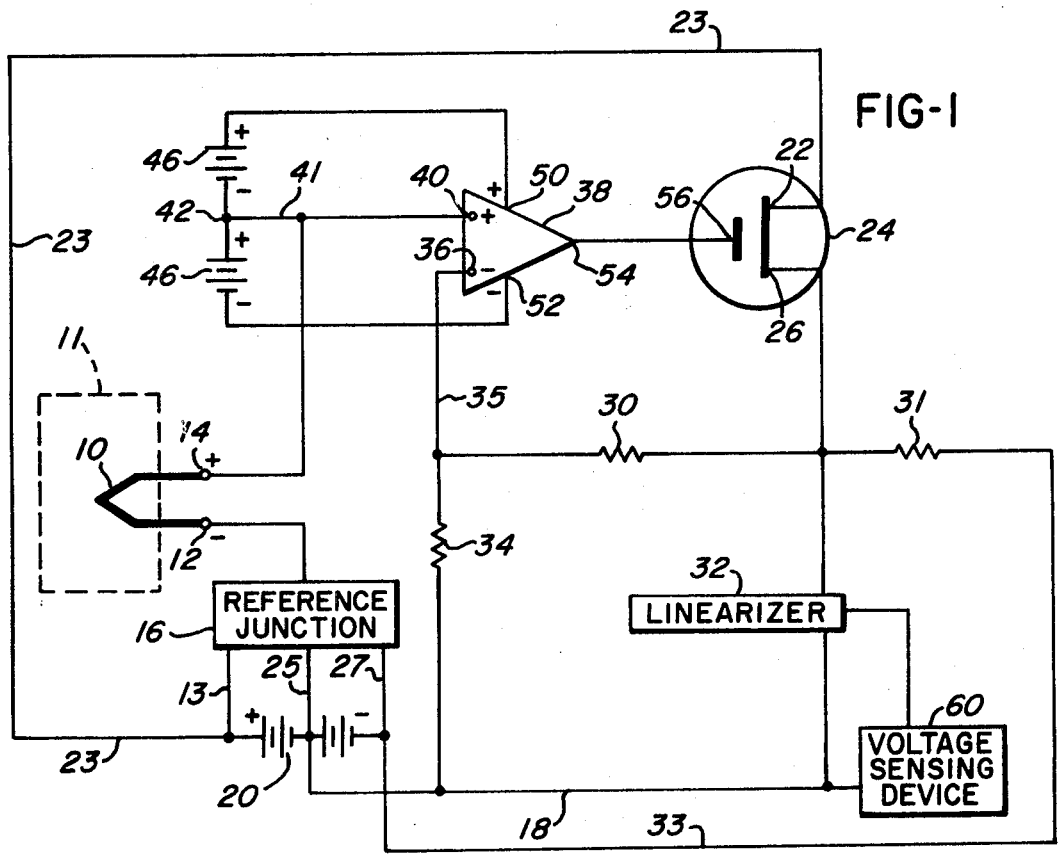
FIG. 1 of the drawing is a schematic diagram of thermocouple input temperature sensing circuitry of this invention.

The circuitry of this invention is adapted to be joined to a thermocouple 10 which is shown as being located in a position or region 11, the temperature of which is sensed by the circuitry of this invention. The thermocouple 10 is, preferably, a junction type of device which has an output voltage which is related to the temperature thereof.

The thermocouple 10 has cold junction terminals 12 and 14 which are exterior of the region 11 within which the thermocouple 10 is located. The terminal 12 is joined to a reference junction unit 16, which is any suitable unit which is capable of producing a voltage which is directly related to the temperature thereof.

The reference junction unit 16 is also connected by a conductor 13 to the positive portion of a power supply or source of electrical energy 20. A conductor 25 joins the reference junction unit 16 to a midportion of the power supply 20, and a conductor 27 joins the reference junction unit 16 to a negative portion of the power supply 20. Herein the power supply or source of electrical energy 20 is shown as consisting of a battery. However, the power supply 20 may be any other suitable source of direct current electrical energy, such a rectified output of an alternating current source of electrical energy, or the like.

Figure 2:
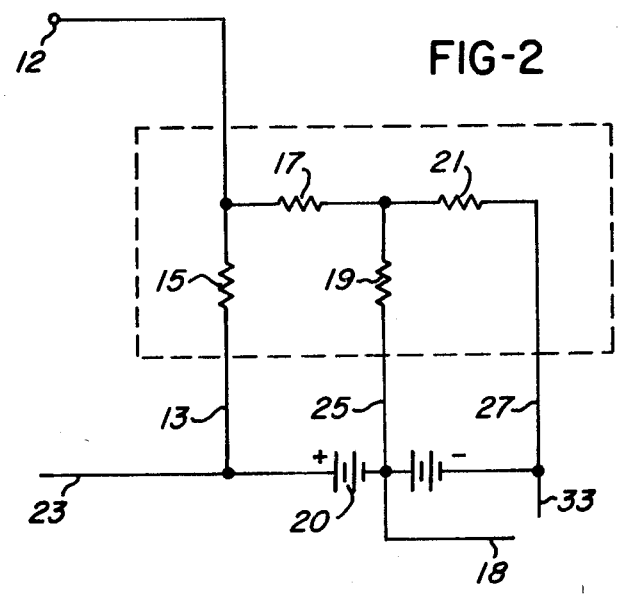
FIG. 2 is a schematic diagram of a portion of circuitry which may be included as a part of the circuitry of this invention.

Preferably, but not necessarily, the reference junction unit 16 includes circuitry shown in FIG. 2 which comprises an impedance element 15 which is joined to the terminal 12 and which is also joined to the power supply or source of electrical energy 20. An impedance element 17 is also connected to the terminal 12 and to a junction between an impedance element 19 and an impedance element 21. The impedance elements 19 and 21 are connected across a portion of the power supply 20. The impedance values of the elements 17 and 19 are relatively low.

As shown in FIG. 1, the power or source of electrical energy 20 is also joined to a high impedance solid state power amplifier, herein shown as a metal oxide semiconductor field-effect transistor 24, which, for example, may be a transistor referred to by RCA as Number 3N138. The source of electrical energy 20 is connected by a conductor 23 to a drain electrode 22 of the field-effect transistor 24. The metal oxide semiconductor field-effect transistor 24 has a source electrode 26 which is connected to an impedance element or resistor 30 and which is also connected to a linearizer 32. The linearizer 32 comprises any suitable linearizing circuit which senses the nonlinearity of the amplified thermocouple signal voltage at the source electrode 26 and in a predetermined program converts the nonlinear signal into a linear signal in which the output of the linearizer 32 is a linear function of temperature. A suitable linearizing circuit has been found to be a solid state function generator in which the amplified signal is applied to a resistor divider network which at predetermined levels of amplified signal, the ratio of the resistor divider network is changed via active and passive components. This ratio is changed so that while the input is a nonlinear function of temperature, the output is a linear function of temperature. The source electrode 26 is also joined to an impedance element or resistor 31, which is connected by a conductor 33 to the negative portion of the power supply 20.

A conductor 18 is connected to the conductor 25. The resistor 30 is also joined to an impedance element or resistor 34 which is connected to the conductor 18. The resistor 34 is also connected by a conductor 35 to a signal input terminal 36 of a high gain voltage amplifier 38. The amplifier 38 is preferably one which has very low input offset voltage drift, i.e., a drift which may result from temperature and/or time. The amplifier 38 may, for example, be an amplifier referred to by Analog Devices Company, Cambridge, Massachusetts, as Model Number 232 J. However, other amplifiers may also be satisfactory. The high gain voltage amplifier 38 also has a signal input terminal 40, which is connected by a conductor 41 to an intermediate tap 42 of a source of electrical energy or power supply 46. The power supply or source of electrical energy 46 may be any suitable source of direct current electrical energy, such as rectified alternating current energy, or a battery, as shown, or the like. The power supply 46 is also joined to power supply input terminals 50 and 52 of the high gain amplifier 38.

The amplifier 38 has an output terminal 54 which is connected to a gate electrode 56 of the transistor 24.

The linearizer 32 is connected to any suitable voltage sensing device 60, which as an indicator or recording meter or instrument, which indicates and/or records and/or controls temperature. The device 60 may, if desired, be a digital indicating meter. The voltage sensing device 60 and the linearizer 32 are also connected to the conductor 18.

OPERATION

The thermocouple 10 is disposed within a position or region 11, the temperature of which is sensed and/or controlled by circuitry of this invention. The thermocouple 10 produces a voltage which changes with the temperature of the region 11. All of the other elements shown in the figures of the drawing are in a region outside the region 11 and have a temperature normally different from that of the region 11.

The reference junction unit 16, which is in series with the thermocouple 10, provides a voltage which has a direct relationship to the temperature of the elements other than the thermocouple 10. For example, the voltage output of the reference unction unit 16 may be based upon zero degrees centigrade or Fahrenheit so that no voltage output appears between terminal 14 and the conductor 18 when the region 11 is at zero degrees. When the circuitry of FIG. 2 is employed as a part of the reference junction unit 16, the impedance elements 15, 17, 19 and 21 are adjusted so that when the region 11 is at zero degrees, substantially no voltage exists between the terminal 14 and the conductor 18, regardless of the ambient temperature within which the circuitry is disposed. The impedance of the impedance element 17 is directly related to the temperature thereof. Thus, a change in ambient temperature produces a voltage change between the terminal 12 and the conductor 18. This change nulls out any changes in voltage at the terminals 14 and 12 caused by change in ambient temperature. Thus, regardless of the temperature of the elements outside the region 11, the voltage between the conductors 18 and 41 is continuously proportional to the temperature within the region 11, as sensed by the thermocouple 10.

The conductor 41 provides an input to the amplifier 38 at the terminal 40, and the conductor 35 provides an input to the amplifier 38 at the terminal 36. For reasons discussed below, the voltage applied across the signal input terminals 36 and 40 of the amplifier 38 is normally maintained at a substantially given predetermined value, regardless of the temperature sensed by the thermocouple 10.

When, for example, an increase in the temperature sensed by the thermocouple 10 occurs, there is a momentary rise or a tendency to rise in the voltage applied across the signal input terminals 36 and 40 of the amplifier 38. Thus, the output voltage of the amplifier 38, which is applied to the gate element 56 of the transistor 24 increases. The metal oxide semiconductor field-effect transistor 24 herein is a potential control device and is used as a source follower and serves as an interface power amplifier. As stated above, the amplifier 38 is a high-gain amplifier, which for example, may have a gain of $10^7$. Therefore, a change of a few microvolts in the potential applied across the signal input terminals 40 and 36 of the amplifier 38 results in a very large change in the potential at the output terminal 54 which is applied to the gate electrode 56 of the transistor 24. The potential at the source electrode 26 is controlled by the potential applied to the gate electrode 56 of the transistor 24. Thus, with a rise in the potential of the gate electrode 56, there is a rise in the voltage at the source electrode 26 with respect to the conductor 18. Thus, the potential across the resistors 34 and 30 increases in a direct ratio to the increase in voltage from the source electrode 26 to the conductor 18.

In order that the potential applied across the input terminals 36 and 40 of the amplifier 38 constantly remains at substantially the same voltage, the voltage across the resistor 34 must be maintained at a given value with respect to the voltage from the terminal 14 to the conductor 18. For this reason, the rise in voltage across the resistor 34, which was initiated by a rise in output voltage of the thermocouple 10, causes the potential across the input terminals 40 and 36 to be lowered by a given value to maintain the voltage between the input terminals 36 and 40 at substantially a constant value.

The power supply 20 provides current which flows through the drain electrode 22 and through the source electrode 26 of the transistor 24. Due to the fact that the current through the transistor 24 is supplied by the power supply 20, an insignificant amount of current flows from the power supply 46 through the thermocouple 10 to the conductor 18. Thus, the circuitry has very high impedance to the terminals 12 and 14 of the thermocouple 10.

As discussed above, the voltage across the resistor 34 is equal to the voltage between the conductor 41 and the conductor 18. This voltage is also proportional to the voltage from the source electrode 26 to the conductor 18. Thus, the voltage across the linearizer 32 is proportional to the voltage between the terminal 14 and the conductor 18. This proportion is a high ratio. The voltage between the terminal 14 and the conductor 18 is directly proportional to the voltage across the terminals 14 and 12. The voltage across the terminals 14 and 12 is directly related to the temperature of region 11. Thus, the voltage across the linearizer 32 is directly related to the temperature of region 11.

The linearizer 32 is used to compensate for the nonlinear voltage output of the thermocouple 10. The linearizer 32 provides an output voltage which is directly proportional to the temperature of region 11. Therefore, a voltage sensing device, such as the instrument 60, which is connected to the linearizer 32, can be calibrated in degrees.

The impedance element or resistor 31, connected from the negative portion of the power supply 20 to the source electrode 26 of the transistor 24, provides a negative bias to the source electrode 26. Thus, when the voltage between the terminal 14 and the conductor 18 becomes negative, the source electrode 26 becomes negative. Such conditions occur if the temperature of the region 11 becomes lower than zero degrees. Thus, the circuitry of this invention is capable of sensing temperatures which are either above or below zero degrees, or which are above or below a predetermined value.

In some types of uses of a thermocouple for sensing temperature, the thermocouple, either inadvertently or by reason of the nature of the material in engagement therewith, comes into contact with a circuit having a voltage other than ground potential. This is known as a common mode voltage. Such a condition causes a current to flow through the thermocouple and through the sensing circuitry and to ground. Due to the fact that the impedance of the resistance elements 19 and 17 in the reference junction unit 16 are of low value, the voltage created by any leakage currents, caused by the common mode voltage, is insignificant. Thus, the circuitry of this invention has high common mode rejection.

Thus, it is understood that circuitry of this invention overcomes objections in conventional temperature sensing circuitry. Also, the circuitry of this invention can be constructed to have a small physical size.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

I claim:

1. Temperature sensing apparatus comprising:
   a thermocouple,
   a reference voltage unit connected to the thermocouple in series relationship therewith,
   a voltage amplifier having a signal input portion and an output portion,
   means connecting the thermocouple to the signal input portion of the voltage amplifier,
   a first source of electrical energy, the first source of electrical energy being connected to the amplifier for operation thereof,
   means joining the signal input portion of the amplifier to the first source of electrical energy,
   common conductor means,
   means joining the reference voltage unit to the common conductor means,
   a first impedance element,
   means connecting the first impedance element to the common conductor means,
   means joining the first impedance element to the signal input portion of the amplifier,
   a metal-oxide semiconductor field-effect transistor having a gate electrode, a drain electrode, and a source electrode,
   means joining the output portion of the amplifier to the gate electrode of the transistor,
   a second source of electrical energy,
   means joining the second source of electrical energy to the drain electrode of the transistor and to the common conductor means,
   a second impedance element,
   means joining the second impedance element to the source electrode of the transistor and to the input portion of the amplifier and to the first impedance element,
   output receiver means,
   means connecting the output receiver means to the source electrode of the transistor and to the common conductor means, the impedance elements and the thermocouple and the reference junction unit cooperatively applying a substantially constant voltage to the signal input portion of the amplifier, regardless of the output voltage of the thermocouple and of the reference voltage unit, the voltage of the output portion of the amplifier thus being applied to the output receiver means in nonlinear relationship to the temperature of the thermocouple.

2. The apparatus of claim 1 in which the reference voltage unit includes a first resistor and a second resistor connected to the thermocouple, the first resistor also being connected to the second source of electrical energy, a third resistor and a fourth resistor connected in series across a portion of the second source of electrical energy, the second resistor being joined to the junction between the third resistor and the fourth resistor, the resistance of the second resistor being directly related to the temperature thereof.

3. Temperature sensing circuitry for use with a thermocouple which is disposed within a region, for sensing thereof, comprising:

a low impedance reference voltage unit for connection to a thermocouple and which produces a voltage which is directly related to the temperature thereof, the reference voltage unit being disposed in a region other than the region within which the thermocouple is disposed, the reference voltage unit sensing the ambient temperature of the region within which it is disposed, amplifier means, the amplifier means having a high impedance solid state power output portion, the amplifier means having a signal input portion, voltage divider means joining the output portion of the amplifier means and the reference voltage unit and the thermocouple to the signal input portion of the amplifier means, power supply means, means joining the power supply means to the output portion and to the input portion of the amplifier means so that the voltage applied to the input portion of the amplifier means is related to the voltage at the output portion of the amplifier means, connector means for joining the power supply means and the output portion of the amplifier means to output receiver means, the signal input portion of the amplifier means including a high gain voltage amplifier portion, the high impedance solid state power output portion including a metal oxide semiconductor field-effect transistor having a gate electrode, the high gain voltage amplifier portion being joined to the gate electrode of the metal oxide semiconductor field-effect transistor.

4. The circuitry of claim 3 in which the metal oxide semiconductor field-effect transistor also has a source electrode and a drain electrode, the voltage divider means being joined to the source electrode, the power supply means being joined to the drain electrode.

5. The circuitry of claim 4 in which the connector means include means joined to the source electrode and to the voltage divider means.

* * * * *